(12) United States Patent
D'Amato et al.

(10) Patent No.: US 7,571,057 B2
(45) Date of Patent: Aug. 4, 2009

(54) SYSTEM AND METHOD FOR MONITORING DEGRADATION

(75) Inventors: Fernando Javier D'Amato, Niskayuna, NY (US); Vivek Venugopal Badami, Schenectady, NY (US); Jitendra Kumar, Mableton, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/228,973

(22) Filed: Sep. 16, 2005

(65) Prior Publication Data

US 2007/0067114 A1    Mar. 22, 2007

(51) Int. Cl.
  *G01B 3/00*  (2006.01)
  *G01B 5/00*  (2006.01)
  *G06F 19/00* (2006.01)
(52) U.S. Cl. .................. 702/33; 702/104; 702/183; 701/100; 73/116.03; 700/287; 415/118
(58) Field of Classification Search ............. 702/33–35, 702/90, 98, 99, 104, 113, 183–184; 701/100, 701/29; 73/116, 116.03; 700/287, 274; 415/118, 415/61
See application file for complete search history.

(56) References Cited

U.S. PATENT DOCUMENTS

| | | | | |
|---|---|---|---|---|
| 4,215,412 A | * | 7/1980 | Bernier et al. | 701/100 |
| 4,314,441 A | * | 2/1982 | Yannone et al. | 60/39.281 |
| 5,210,704 A | | 5/1993 | Husseiny | |
| 6,928,370 B2 | * | 8/2005 | Anuzis et al. | 702/56 |
| 7,027,953 B2 | * | 4/2006 | Klein | 702/184 |
| 7,062,370 B2 | * | 6/2006 | Vhora et al. | 701/100 |
| 7,343,274 B2 | * | 3/2008 | Golner et al. | 703/9 |

OTHER PUBLICATIONS

Greitzer et al., 'Development of a Framework for Predicitng Life of Mechanical Systems: Life Extension Analysis and Prognostics (LEAP)', Sep. 2, 1999, SOLE Symposium, Las Vegas, NV, pp. 1-7.*
Holloway, 'Model Based Transient Control and Component Degradation Monitoring in Generation IV Nuclear Power Plants', Mar. 2003, DOE, pp. 1-10.*
Verbruggen, 'Wind Turbine Operation & Maintenance based on Condition Monitoring', Apr. 2003, ECN, pp. 1-39.*
Nguyen et al., 'A System Approach to Machinary Conditions Monitoring and Diagnostic', Jan. 2001, Lockheed Martin Information Systems, pp. 1-12.*

(Continued)

*Primary Examiner*—Edward Raymond
*Assistant Examiner*—Elias Desta
(74) *Attorney, Agent, or Firm*—Cantor Colburn LLP

(57) ABSTRACT

A degradation monitoring system including: a machine; a sensor affixed to the machine, the sensors measuring a operational parameters of the machine; a set of filters receptive of information about the machine from the sensors and the filters responsively generate status signals; and comparators for comparing the status signals to stored signals, wherein the comparators indicate at least one of a presence of degradation of the machine, or a cause of degradation of the machine.

17 Claims, 2 Drawing Sheets

OTHER PUBLICATIONS

Tanner et al., 'An Integrated Engine Health Monitoring System for Gas Turbine Aero-Engines', May 14, 2003, PSB Publication, pp. 1-12.*

Yang, 'A Condition-Based Failure-Prediction and Processing-Scheme for Preventive Maintenance', Sep. 2003, IEEE Publication, vol. 52, No. 3, pp. 373-383.*

Gayme et al., 'Fault Detection and Diagnosis in Turbine Engines Using Fuzzy Logic', 2004, IEEE Publicaiton, pp. 341-346.*

An Introduction fo the Kalman Filter, Greg Walsh and Gary Bishop, UNC-Chapel Hill, TR 95-041, Apr. 5, 2004.

* cited by examiner

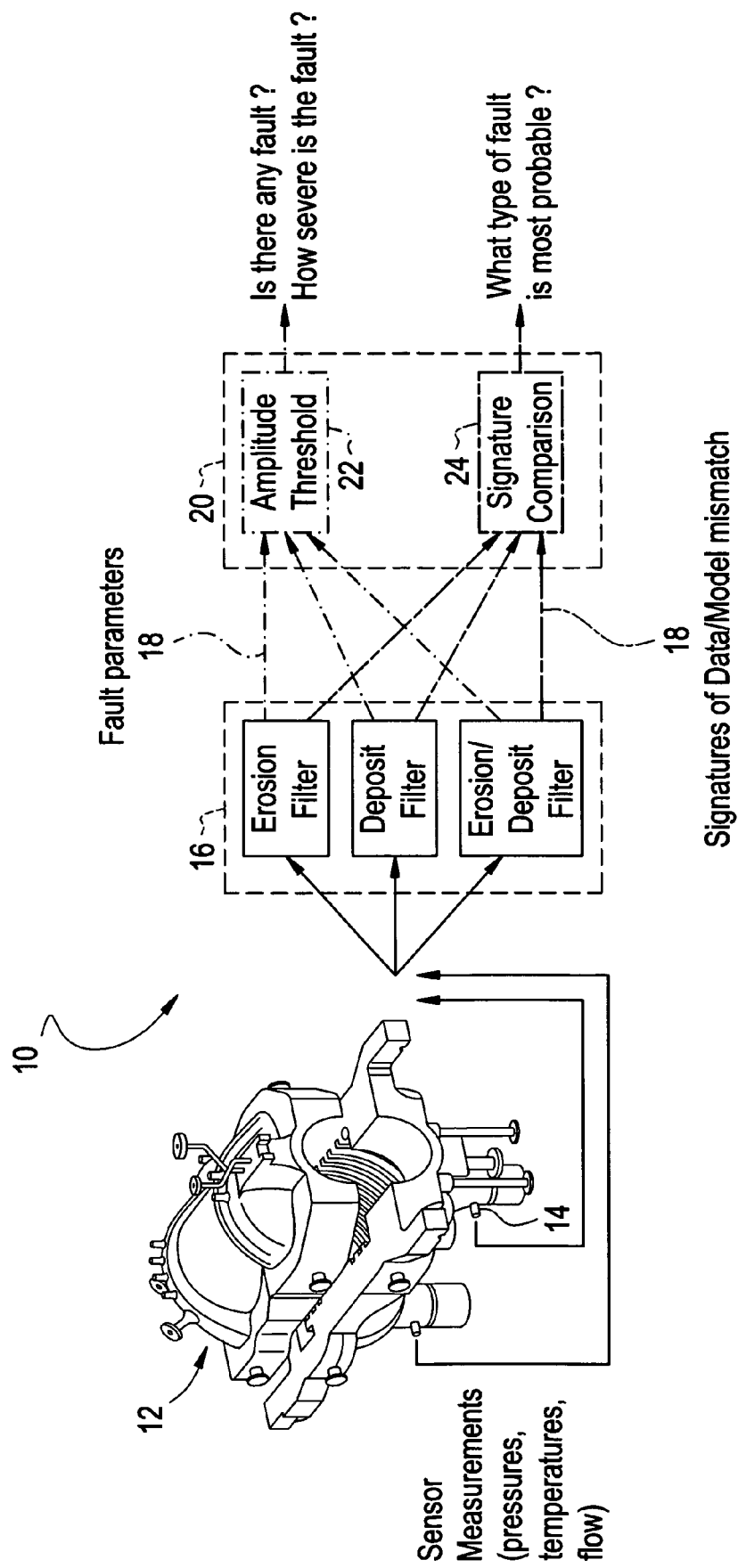

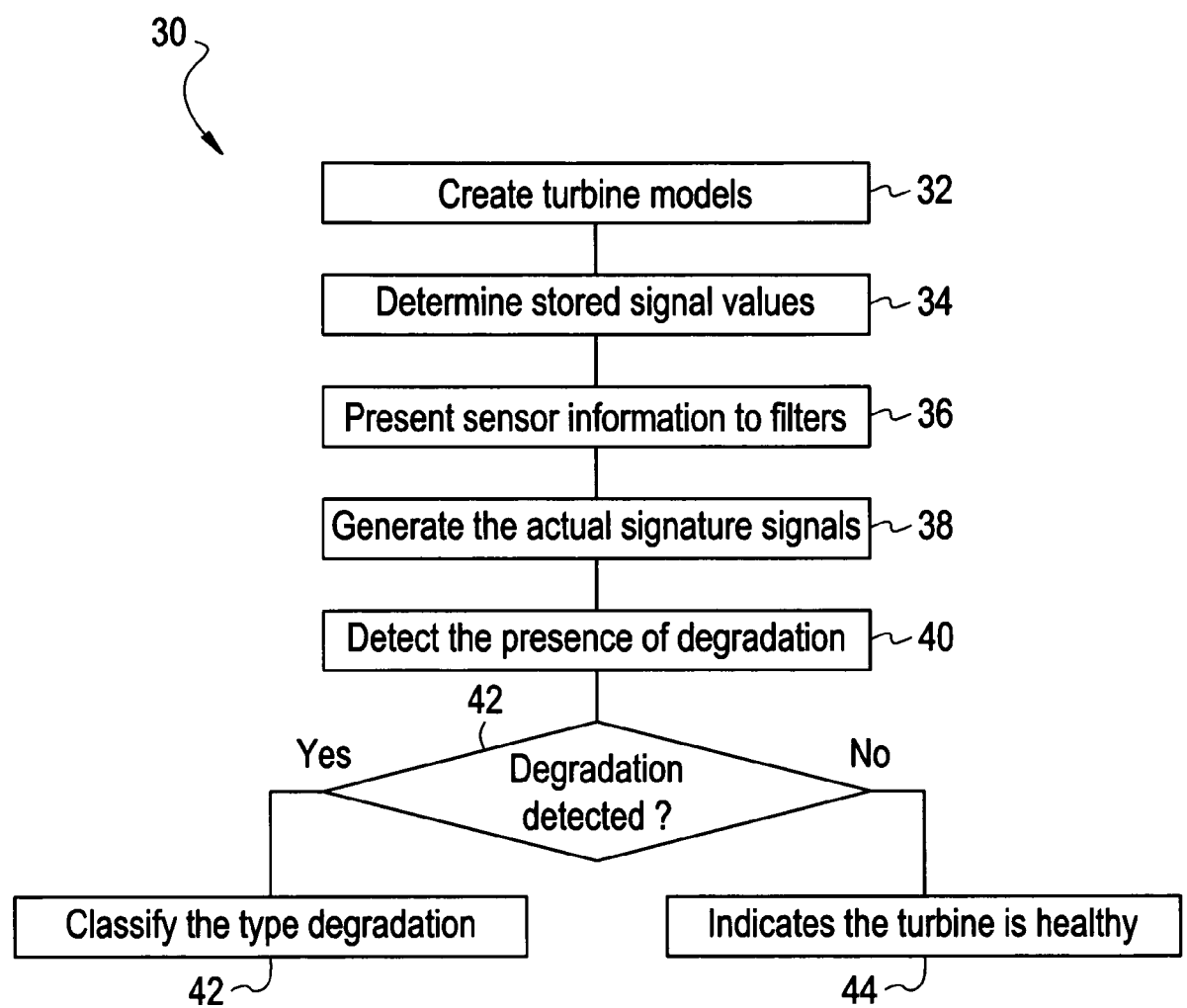

SYSTEM AND METHOD FOR MONITORING DEGRADATION

BACKGROUND

This disclosure relates generally to a system and method for monitoring turbine degradation. Specifically, this disclosure relates to an automated system and method for monitoring steam turbine degradation.

Turbines suffer performance degradation over time from various sources such as solid particle erosion, deposit buildup, foreign object damage, and increased clearances due to rubs, etc. Currently, when the performance of the turbine reaches unacceptably low values, the turbine is opened to evaluate the extent and nature of the degradation and to perform corrective maintenance work to improve the condition of the turbine. Prior knowledge of the turbine health is important for planning maintenance work, scheduling outages, and ordering parts in advance of maintenance in order to minimize outage time.

Detailed steam turbine performance information is typically obtained through performance evaluations tests (PETs), which are performed either at the turbine installation or before and after an outage. In between PETs, performance is usually monitored using offline trending data from sensors in the steam turbine. This trending information is analyzed using a set of heuristic rules to decide possible causes for a given degradation. Expert engineers, who need to account for external effects that may confound the degradation in the trending data, are required to analyze the trending data.

The assessment of steam turbine performance degradation has always been important to maintaining operating margins in the power generation business, and it is becoming increasingly critical for satisfying contractual guarantees on performance, output, and availability. Current approaches to steam turbine health monitoring and diagnostics rely almost entirely on heuristic algorithms. This approach is prone to errors, due to lack of appropriate expert knowledge, incomplete sensor data, and changing system characteristics.

BRIEF DESCRIPTION

Disclosed herein is a turbine degradation monitoring system including: a turbine; a sensor affixed to the turbine, the sensor measuring an operational parameter of the turbine; a processor receptive of information about the turbine from the sensor and the processor responsively generates a status signal; and a comparator for comparing the status signal to a stored signal, wherein the comparator indicates at least one of a presence of degradation of the turbine, or a cause of degradation of the turbine.

Also disclosed herein is a method for monitoring turbine degradation including: developing a physics-based model of a turbine, wherein the physics-based model includes a stored signal; monitoring an operational parameter of the turbine with a sensor; processing the operational parameters received from the sensor, wherein the processing generates an status signal; and comparing the status signal and the stored signal to detect at least one of a presence of degradation of the turbine, or a cause of degradation of the turbine.

Further disclosed herein is a system for monitoring turbine degradation including: means for developing a physics-based model of a turbine, wherein the physics-based model includes a stored signal; means for monitoring an operational parameter of the turbine; means for generating a status signal responsive to the operational parameter of the turbine; and means for comparing the status signal and the stored signal to detect at least one of a presence of degradation of the turbine, or a cause of degradation of the turbine.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

These and other features, aspects, and advantages of the present disclosure will become better understood when the following detailed description is read with reference to the accompanying figures, wherein:

FIG. 1 depicts an exemplary embodiment of a turbine degradation monitoring system; and FIG. 2 depicts a flow chart of a method for monitoring turbine degradation.

DETAILED DESCRIPTION

Referring to FIG. 1, a turbine degradation monitoring system is generally depicted at 10. The turbine degradation monitoring system 10 includes a turbine 12 and sensors 14, which are capable of measuring operational parameters of the turbine 12. The operational parameters to be measured may be, but are not limited to, a pressure in the turbine 12, a temperature in the turbine 12, a steam flow through the turbine 12, metal temperatures of components of the turbine 12, steam valve position, steam quality and may also be a combination of these or a combination including one of the foregoing. The turbine degradation monitoring system 10 also includes filters 16 that receive information about the operation of the turbine 12 from sensor 14 and responsively generates a status signal 18. The status signal 18 is presented to a comparator 20, which compares the status signal 18 to a stored signal to detect the presence of degradation in the turbine 12 as well as the source of the degradation. The stored signal may be either a threshold value 22, a minimum value that is indicative of degradation in the turbine 12, or a degradation signature signal 24, a signal indicative of the response of the processor 16 to a specific type of degradation in the turbine 12. The turbine degradation monitoring system 10 may generate the stored signal by using a model of the turbine 12.

The turbine degradation monitoring system 10 requires the development of a model of the physics of the steam flows in the turbine 12 and of the effects of physical parameters responsible for the degradation of the steam path. More specifically, a physics-based model that describes the internal energy and mass balances for a healthy turbine 12 is required for the generation of the threshold value 22. Additionally, a separate physics-based model is required that corresponds to each type of degradation considered, such as solid particle erosion, deposit buildup, foreign object damage, and increased clearances due to rubs, etc. These models, referred to as typical degradation models, each generate a degradation signature signal 24 indicative of degradation parameters for the specific degradation type.

In an exemplary embodiment, the filters 16 are presented with information from the sensors 14 and responsively adjust the status signals 18. The turbine degradation monitoring system 10 includes one filter 16 for each type of degradation of the turbine 12 that is considered. The filter 16 provides an estimate of the state of the turbine 12 and supports estimations of past, present, and even future states of the turbine 12. The response of each filter 16 to information from given sensors 14 may be different since each filter 16 may be configured to detect different forms of degradation. The turbine degradation monitoring system 10 uses the response of each filter 16 to typical forms of degradation as a basis to determine the nature of an unknown source of degradation. Specifically, the information from sensors 14 in operable communication with the turbine 12 that includes a known type of degradation is presented to every filter 16 and the response of each filter 16 is recorded for different values of the degradation parameters. The filter 16 response for typical degradation types is referred to as the degradation signature signal 24. All of the degradation signature signals 24 are used to create a database of degradation signature signals 24, which will be accessed during the operation of the turbine degradation monitoring system 10.

In a particular exemplary embodiment, the filters 16 used by the turbine degradation monitoring system 10 includes a Kalman-type filter. The use of the Kalman-type filter allows for an optimal handling of tradeoffs between sensor 14 noises and modeling uncertainty, which results in an optimal filtering of the information received from sensors 14 to provide a fast and accurate response from the filter 16. Generally, the use of filters 16 including physics-based models (for healthy turbines and for turbines with faults) allows filtering out confounding effects in the information from the sensors 14, like changes in the operating point of the turbine 12. For example, changes in the steam flow due to changes in the HRSG or condenser operation may be automatically removed from the analysis.

Referring now to FIG. 2, a flow chart of a method for monitoring turbine degradation is generally depicted at 30. The first step in the method for monitoring turbine degradation 30, shown at step 32, is the development of physics-based models that describe the internal energy and mass balances for healthy turbines and for turbines that include each type of degradation to be considered. These models are developed by collecting and storing information from sensors 14 which are monitoring turbines that are known to be healthy or to have a specific type of degradation. The next step in the method for monitoring turbine degradation 30, shown at step 34, is to determine the stored signals from the physics-based models. Specifically, the information from the healthy turbine is used to generate the threshold value 22, which is a minimum value indicative of a healthy turbine, and the information from the turbines that include specific types of degradation is used to create a database of the degradation signature signals 24, which are indicative of the operation of a turbine 12 that suffers from a specific type of degradation. The next step in the method for monitoring turbine degradation 30, shown at step 36, is to present information from the sensor 14 about the turbine 12 to the processors 16 (one processor 16 for each type of degradation to be considered). At step 38, the filters 16 generate the status signals 18 responsive to the information received from the sensors 14.

Continuing with FIG. 2, as shown at step 40, the method for monitoring turbine degradation 30 detects the presence of degradation using the magnitude of the status signal 18: if the status signal 18 is less than the threshold value 22 then no degradation is present; otherwise, the method for monitoring turbine degradation 30 declares the presence of degradation. If degradation is detected then the method for monitoring turbine degradation 30 classifies the degradation as an instance of a standard degradation mechanism or declares that root cause of degradation is not recognized by comparing the status signals 18 to the degradation signature signals 24, as shown at step 42. Quantitative information on the severity of the degradation may be obtained from the status signal 18 provided by the processor 16 corresponding to the chosen degradation cause. On the other hand, if no degradation is detected, the method for monitoring turbine degradation 30, at step 44, indicates that the turbine 12 is healthy.

The method for monitoring turbine degradation relies on sensor measurements, on system models that represent each type of degradation under consideration, and on an algorithm that calculates models parameters quantitative and qualitative information on the fault or degradation. In an exemplary embodiment, the algorithms that calculate degradation parameters are Kalman filters. Kalman filtering is a mature technology based on measurements and models, typically used to estimate states or parameters that may not be directly measured. In a exemplary application such as turbine degradation estimation, Kalman filters use measurements of steam temperatures, pressures and flows, and physical models of the turbine to continuously calculate the most probable set of parameters for erosion or deposit degradations that may originate the current measurements. Kalman filter technology is applicable when the system models are linear. In case the models are non linear, various other similar techniques for non linear systems may be used. For example, a suitable algorithm for turbine degradation estimation is the extension of Kalman filter techniques for nonlinear systems, known as Extended Kalman Filters (EKF).

The use of Kalman filter techniques to estimate turbine degradation parameters in different degradation scenarios, like changes in steam path geometry for erosion and/or deposits degradation. As a result of the filter calculations, values of steam magnitudes (pressures, temperatures or flows) for different degradation scenarios are available in real time to improve the diagnosis capabilities. The mismatch between these magnitudes and the corresponding sensor measurements are denoted by status signals and are used to diagnose the turbine degradation.

The method for monitoring turbine degradation 30 provides information about the turbine 12 as described above in real time for use in plant monitoring and outage planning/scheduling. Additionally, the method for monitoring turbine degradation 30 does not require the presence of an expert to diagnose performance problems from information received from the sensors 14. The method for monitoring turbine degradation 30 produces performance diagnosis information all the time, making this information available to an operation expert if further analysis is required.

By continuously estimating turbine degradation, the method for monitoring turbine degradation 30 can fill in the gaps in the knowledge of the state of the turbine 12 between manual inspections, potentially allowing the elimination of unnecessary and expensive manual inspections in the future. Additionally, the method for monitoring turbine degradation 30 provides an automated, model-based steam degradation and trending system to provide assistance to the above-mentioned manual process by detecting and pinpointing changes in turbine health on a continuous basis, rather than at periodic intervals, as is done today.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A degradation monitoring system comprising:
    a sensor, said sensor measuring an operational parameter of a machine;
    a filter receptive of information about said machine from said sensor and said filter responsively generates a status signal; and
    a comparator for comparing said status signal to a stored degradation signal, wherein said comparator indicates a presence of degradation of said machine and a cause of the degradation of said machine to provide the degradation monitoring.

2. The system of claim 1 wherein said operational parameter comprises at least one of a pressure, a temperature, metal temperatures of a component of a turbine, steam valve position, and a steam quality or flow.

3. The system of claim 1 wherein said stored degradation signal is a threshold value, said threshold value is a minimum value indicative of degradation in said machine.

4. The system of claim 1 further comprising at least one additional stored degradation signal, wherein said stored degradation signals are degradation signature signals, said degradation signature signals are indicative of responses of said filter to specific forms of degradation in real time, and wherein said comparator continuously compares said status signal to said degradation signature signals in real time.

5. The system of claim 1, wherein said cause of degradation comprises at least one of:
    a solid particle erosion;
    a deposit buildup;
    a foreign object damage; and
    an increased clearance due to rubs.

6. The system of claim 1 wherein said filter includes a Kalman-filter.

7. The system of claim 1 wherein said machine is a turbine.

8. A method for monitoring turbine degradation comprising:
    developing a physics-based model of a turbine, wherein said physics-based model includes a stored degradation signal;
    monitoring an operational parameter of said turbine with a sensor;
    processing said operational parameters received from said sensor, wherein said processing generates a status signal; and
    comparing said status signal and said stored degradation signal, and detecting and indicating a presence of degradation of said turbine and a cause of degradation of said turbine to provide the monitoring of turbine degradation.

9. The method of claim 8 wherein said operational parameter comprises at least one of a pressure, a temperature, metal temperatures of a component of the turbine, steam valve position, and a steam quality or flow.

10. The method of claim 8 wherein said stored degradation signal is a threshold value, said threshold value is a minimum value indicative of degradation in said turbine.

11. The method of claim 8 wherein said stored degradation signal is a degradation signature signal, said degradation signature signal is indicative of a response of said processing to a specific form of degradation.

12. The method of claim 8 wherein said cause of degradation comprises at least one of:
    a solid particle erosion;
    a deposit buildup;
    a foreign object damage; and
    an increased clearance due to rubs.

13. A system for monitoring turbine degradation comprising:
    means for developing a physics-based model of a turbine, wherein said physics-based model includes a stored degradation signal;
    means for monitoring an operational parameter of said turbine;
    means for generating a status signal responsive to said operational parameter of said turbine; and
    means for comparing said status signal and said stored degradation signal to detect a presence of degradation of said turbine and a cause of degradation of said turbine to provide the monitoring of turbine degradation.

14. The system of claim 13 wherein said operational parameter comprises at least one of a pressure, a temperature, and a steam flow.

15. The system of claim 13 wherein said stored degradation signal is a threshold value, said threshold value is a minimum value indicative of degradation in said turbine.

16. The system of claim 13, wherein said cause of degradation comprises at least one of:
    a solid particle erosion;
    a deposit buildup;
    a foreign object damage; and
    an increased clearance due to rubs.

17. The system of claim 1, further comprising a filter for at least one of erosion and deposit detection.

* * * * *